(12) United States Patent
Sadamitsu (10) Patent No.: US 11,056,949 B2
(45) Date of Patent: Jul. 6, 2021

(54) ROTATING ELECTRICAL MACHINE

(71) Applicant: TOYOTA JIDOSHA KABUSHIKI KAISHA, Toyota (JP)

(72) Inventor: Takahiro Sadamitsu, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 126 days.

(21) Appl. No.: 16/568,973

(22) Filed: Sep. 12, 2019

(65) Prior Publication Data
US 2020/0112230 A1    Apr. 9, 2020

(30) Foreign Application Priority Data

Oct. 4, 2018  (JP) .............................. JP2018-188784

(51) Int. Cl.
*H02K 9/00*    (2006.01)
*H02K 9/06*    (2006.01)

(52) U.S. Cl.
CPC ..................................... *H02K 9/06* (2013.01)

(58) Field of Classification Search
CPC .. H02K 9/06; H02K 7/14; H02K 9/19; H02K 9/02
See application file for complete search history.

(56) References Cited

U.S. PATENT DOCUMENTS

| | | | | |
|---|---|---|---|---|
| 6,091,168 A * | 7/2000 | Halsey | ..................... | H02K 1/24 310/166 |
| 2009/0230791 A1* | 9/2009 | Scharfenberg | ........... | H02K 9/18 310/62 |
| 2013/0119830 A1* | 5/2013 | Hautz | ...................... | H02K 9/00 310/60 R |
| 2013/0257195 A1* | 10/2013 | Airoldi | ............... | H02K 1/2786 310/53 |
| 2016/0118862 A1* | 4/2016 | Maki-Ontto | ........... | H02K 1/148 310/59 |
| 2017/0012500 A1* | 1/2017 | Brauer | ................... | H02K 9/193 |
| 2017/0012501 A1* | 1/2017 | Sano | ........................ | H02K 9/19 |
| 2018/0191225 A1* | 7/2018 | Paul | ......................... | H02K 9/19 |
| 2018/0274522 A1* | 9/2018 | Airoldi | .................. | F03D 80/60 |
| 2019/0006914 A1* | 1/2019 | Graves | ............... | F16H 57/0427 |

FOREIGN PATENT DOCUMENTS

JP         2003-250248         9/2003

* cited by examiner

*Primary Examiner* — Yuriy Semenenko
(74) *Attorney, Agent, or Firm* — Finnegan, Henderson, Farabow, Garrett & Dunner, LLP (57) ABSTRACT

Provided a rotating electrical machine including a rotor; a stator; and a fluid control mechanism has a first member and a second member, and is configured to create a flow of a fluid directed from one side toward the other side in an axial direction of the rotating shaft, on an outer periphery of the rotor. The first member has a portion at which the outside diameter increases gradually from the one side toward the other side, and is configured such that a shape of an outer circumferential surface is continuous with the shape of an outer circumferential surface of an end portion, in an axial direction, of the rotor. The second member is configured such that an inside diameter increases gradually from the one side toward the other side at a portion facing the portion of the first member at which the outside diameter increases gradually.

9 Claims, 9 Drawing Sheets

SECTION II-II

FIG. 3

SECTION III-III

FIG. 4

SECTION IV-IV

FIG. 5

OTHER SIDE ⟷ ONE SIDE

FIG. 6

OTHER SIDE ⟷ ONE SIDE

SECTION VIII-VIII

ROTATING ELECTRICAL MACHINE

INCORPORATION BY REFERENCE

The disclosure of Japanese Patent Application No. 2018-188784 filed on Oct. 4, 2018 including the specification, drawings and abstract is incorporated herein by reference in its entirety.

BACKGROUND

1. Technical Field

The present disclosure relates to a rotating electrical machine.

2. Description of Related Art

Japanese Patent Application Publication No. 2003-250248 describes a rotating electrical machine including a rotor and a stator. In this rotating electrical machine, a refrigerant entering an annular gap between the rotor and the stator is discharged by fans that create inside the gap an airflow directed toward an open end, in an axial direction, of the gap.

SUMMARY

However, a new technology has been sought that can create a flow of a fluid between a rotor and a stator to cool the rotor, without using a fan to create an airflow.

The present disclosure can be realized in the following form of implementation.

(1) As one form of implementation of the present disclosure, a rotating electrical machine is provided. The rotating electrical machine includes: a rotor disposed on an outer periphery of a rotating shaft and configured to rotate along with the rotating shaft; a stator configured to enclose the rotor; and a fluid control mechanism configured to create, on an outer periphery of the rotor, a flow of a fluid directed from one side toward the other side in an axial direction of the rotating shaft. The fluid control mechanism has a first member and a second member. The first member is disposed on the outer periphery of the rotating shaft, is configured to rotate along with the rotating shaft, and has a portion at which an outside diameter of the first member increases gradually from the one side toward the other side, and is configured such that the shape of an outer circumferential surface of the first member is continuous with the shape of an outer circumferential surface of an end portion, in the axial direction, of the rotor. The second member is disposed on an inner periphery of the stator so as to be separated by a gap from the first member and the rotor, and is configured such that the inside diameter of the second member increases gradually from the one side toward the other side at a portion facing the portion of the first member at which the outside diameter increases gradually. In this form of implementation, the centrifugal force of the rotating first member and rotor causes a fluid around the first member and the rotor to flow toward the second member that is disposed on the inner periphery of the stator so as to be separated by the gap from the first member and the rotor. Since the first member has the portion at which the outside diameter increases gradually from the one side toward the other side in the axial direction, and the inside diameter of the second member increases gradually from the one side toward the other side at the portion facing the portion of the first member at which the outside diameter increases gradually, the fluid having flowed from the first member toward the second member and hit the second member is given a velocity component directed from the one side toward the other side in the axial direction. The fluid having been given the velocity component directed from the one side toward the other side flows through the gap between the first member or the rotor and the second member from the one side toward the other side while repeatedly hitting the first member or the rotor and the second member. Thus, a flow of the fluid directed from the one side toward the other side can be created on the outer periphery of the rotor, which can enhance the rotor cooling efficiency.

(2) In the above form of implementation, a flow regulation structure that regulates a flow of a fluid in the gap may be formed at least either on an inner circumferential surface of the second member or on at least one of an outer circumferential surface of the rotor and the outer circumferential surface of the first member. In this form of implementation, the flow of the fluid in the gap can be regulated. Thus, the rotor cooling efficiency can be further enhanced.

(3) In the above form of implementation, the first member may include a first spacer that is in contact with an end portion, on the one side, of the rotor. In this form of implementation, a flow of the fluid directed from the one side toward the other side can be created on the outer periphery of the rotor by means of the second member and the first spacer that is in contact with the end portion, on the one side, of the rotor.

(4) In the above form of implementation, the first member may include a second spacer that is in contact with an end portion, on the other side, of the rotor. In this form of implementation, a flow of the fluid directed from the one side toward the other side can be created on the outer periphery of the rotor by means of the second member and the second spacer that is in contact with the end portion, on the other side, of the rotor.

(5) In the above form of implementation, the first member may include a flange protruding in a radial direction of the rotating shaft. In this form of implementation, a flow of the fluid directed from the one side toward the other side can be created on the outer periphery of the rotor by means of the flange of the rotating shaft and the second member.

(6) In the above form of implementation, the first member may be a part of the rotor. In this form of implementation, a flow of the fluid directed from the one side toward the other side can be created on the outer periphery of the rotor by means of a part of the rotor and the second member.

(7) In the above form of implementation, the gap may have a dimension of not smaller than 0.5% nor larger than 5% of an outside diameter of an end portion, on the one side, of the first member. In this form of implementation, the rotor cooling efficiency can be further enhanced.

(8) In the above form of implementation, the flow regulation structure may be a protrusion formed along a flow of the fluid.

(9) In the above form of implementation, the flow regulation structure may be a recess formed along a flow of the fluid.

The present disclosure can also be realized in various forms of implementation other than the rotating electrical machine described above. For example, the present disclosure can be realized in the forms of implementation of a compression device including a rotating electrical machine, a fuel cell system including this compression device, etc.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
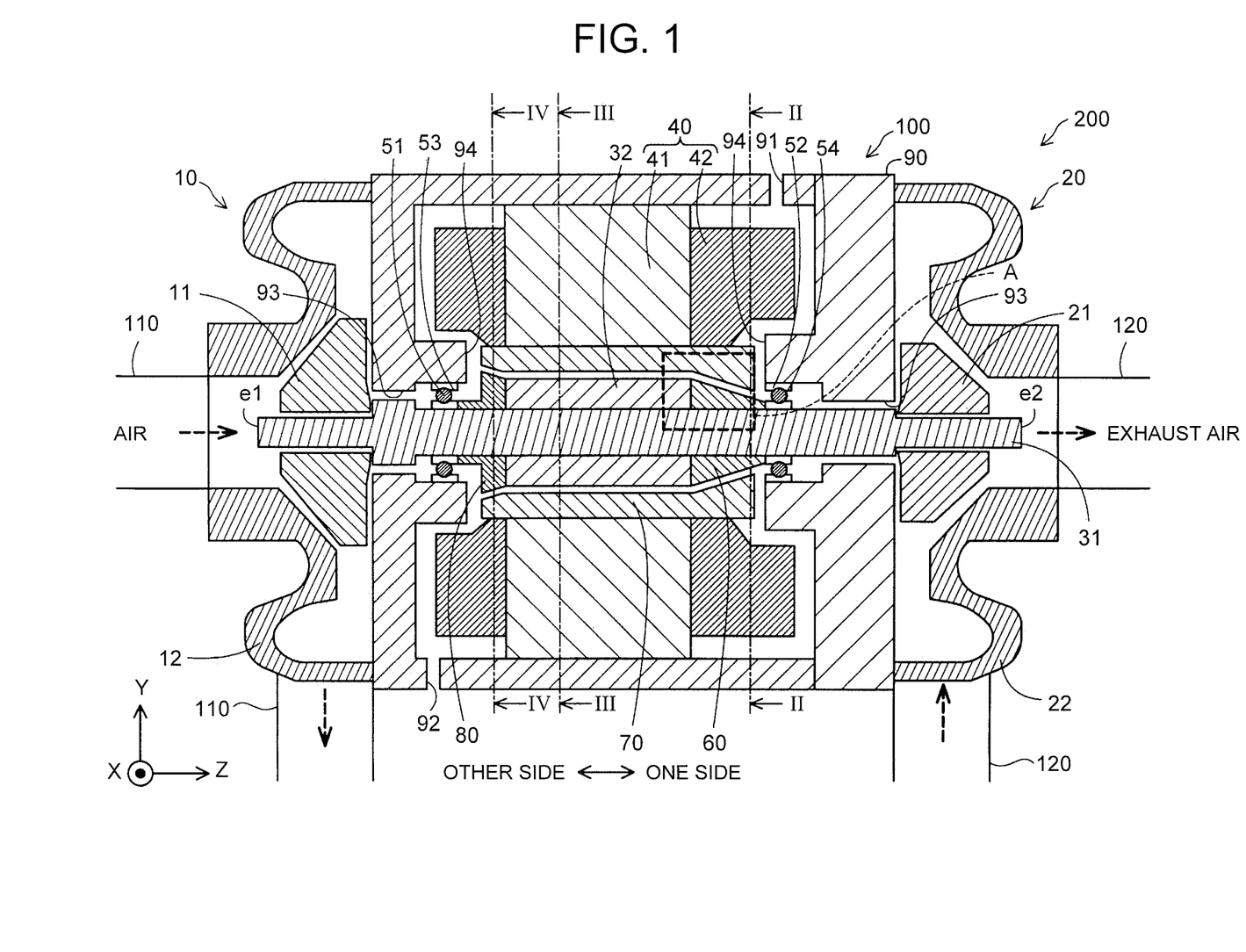
FIG. 1 is a schematic sectional view of a compression device as an embodiment.

FIG. 1 is a schematic sectional view of a compression device 200 as an embodiment. The compression device 200 is a so-called centrifugal electrical compressor. In this embodiment, the compression device 200 supplies compressed air to a fuel cell stack (not shown). The fuel cell stack generates electricity by an electrochemical reaction between hydrogen and oxygen that is contained in the air supplied from the compression device.

The compression device 200 includes a first impeller section 10, a second impeller section 20, and a motor section 100. The motor section 100 includes a rotating shaft 31, a rotor 32, a stator 40, first members 60, 80, and a second member 70. The motor section 100 is also called a "rotating electrical machine." In this embodiment, the motor section 100 further includes bearings 51, 52, bearing cases 53, 54, and a motor housing 90. In FIG. 1, a first flow passage 110 and a second flow passage 120 each connected to the compression device 200 are shown in addition to the compression device 200. In FIG. 1, X-, Y-, and Z-axes that are substantially orthogonal to one another are shown. A Y-axis direction is a vertical direction. A Z-axis direction is an axial direction of the rotating shaft 31 of the motor section 100. An X-axis direction is a direction perpendicular to the Y-axis direction and the Z-axis direction. FIG. 1 is a view intended to clearly show the technical features of the compression device 200 and not to show the exact dimensions of each part. Hereinafter, a +Z-axis side will be referred to as "one side in the axial direction of the rotating shaft 31," or simply "one side," while a −Z-axis side will be referred to as "the other side in the axial direction of the rotating shaft 31," or simply "the other side."

The first flow passage 110 is a flow passage which connects an opening to the atmosphere and the fuel cell stack to each other and through which air supplied to the fuel cell stack flows. The second flow passage 120 is a flow passage which connects the fuel cell stack and an opening to the atmosphere to each other and through which exhaust air discharged from the fuel cell stack flows.

The first impeller section 10 includes a first impeller 11 and a first impeller housing part 12 housing the first impeller 11. The first impeller 11 is provided in the first flow passage 110. The first impeller 11 is connected to an end portion e1, on the other side, of the rotating shaft 31 and rotates along with the rotating shaft 31. As the first impeller 11 rotates, air inside the first impeller housing part 12 is compressed before being delivered to the fuel cell stack. The first impeller 11 is also called a compressor wheel.

The second impeller section 20 includes a second impeller 21 and a second impeller housing part 22 housing the second impeller 21. The second impeller 21 is provided in the second flow passage 120. The second impeller 21 is connected to an end portion e2, on the one side, of the rotating shaft 31. The second impeller 21 rotates the rotating shaft 31 by being rotated by exhaust air flowing through the second flow passage 120. The second impeller 21 is also called a turbine wheel.

The motor housing 90 is located between the first impeller section 10 and the second impeller section 20. The motor housing 90 is a casing housing the rotor 32, the stator 40, the bearings 51, 52, the bearing cases 53, 54, the first members 60, 80, and the second member 70. The motor housing 90 is provided with through-holes 93 through which the rotating shaft 31 extends. From the through-hole 93 on the one side in the axial direction, the end portion e2, on the one side, of the rotating shaft 31 protrudes into the second impeller housing part 22. From the through-hole 93 on the other side in the axial direction, the end portion e1, on the other side, of the rotating shaft 31 protrudes into the first impeller housing part 12. Inside the motor housing 90, the bearing 52, the first member 60, the rotor 32, the first member 80, and the bearing 51 are disposed on an outer periphery of the rotating shaft 31, in this order from the one side toward the other side in the axial direction. An oil supply flow passage 91 and an oil discharge flow passage 92 are formed in the motor housing 90. Oil having been cooled by an oil cooler (not shown) is supplied by an oil pump (not shown) into the motor housing 90 through the oil supply flow passage 91. Oil having cooled parts inside the motor housing 90 is discharged by the oil pump to an outside of the motor housing 90 through the oil discharge flow passage 92.

The bearings 51, 52 rotatably support the rotating shaft 31. The bearing cases 53, 54 house the bearings 51, 52, respectively. The bearing cases 53, 54 are each fixed inside the motor housing 90 by being fitted into an annular housing protrusion 94 protruding toward an inside of the motor housing 90.

Mechanical seals (not shown) are provided near the through-holes 93 of the motor housing 90, between the bearing 51 and the first impeller 11 and between the bearing 52 and the second impeller 21. The mechanical seal is a sealing part including a rotating ring (not shown) that rotates integrally with the rotating shaft 31 and a fixed ring (not shown) that is fixed to the motor housing 90. The mechanical seals restrain the oil having been supplied into the motor housing 90 from flowing out from inside the motor housing 90 to the first impeller section 10 and the second impeller section 20 through the through-holes 93.

The rotor 32 is disposed on the outer periphery of the rotating shaft 31 and rotates along with the rotating shaft 31. The rotor 32 has a columnar shape with a magnet provided on a surface. The stator 40 includes a stator core 41 and coils 42. The stator 40 is disposed on an outer periphery of the rotor 32 and encloses the rotor 32. The stator 40 rotates the rotating shaft 31 through the rotor 32, with the application of a current to the stator 40 being controlled by a controller (not shown).

Figure 2:
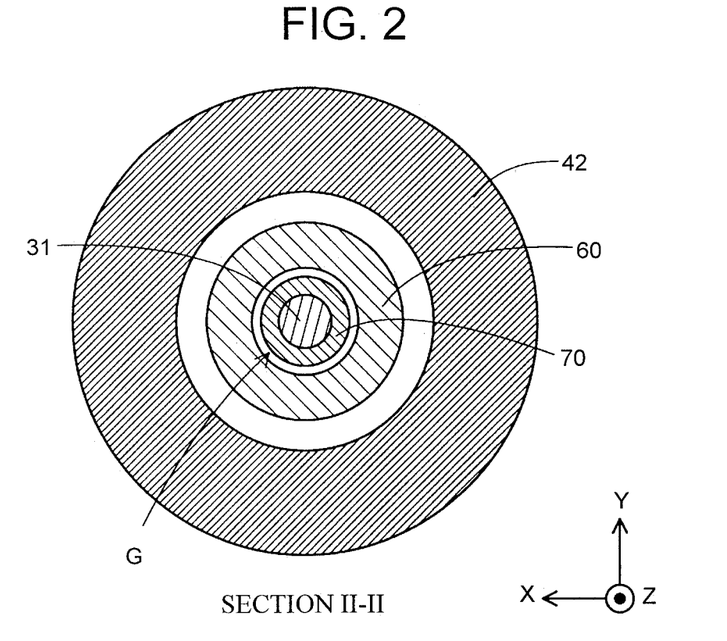
FIG. 2 is a view of section II-II of a motor section shown in FIG. 1.
Figure 3:
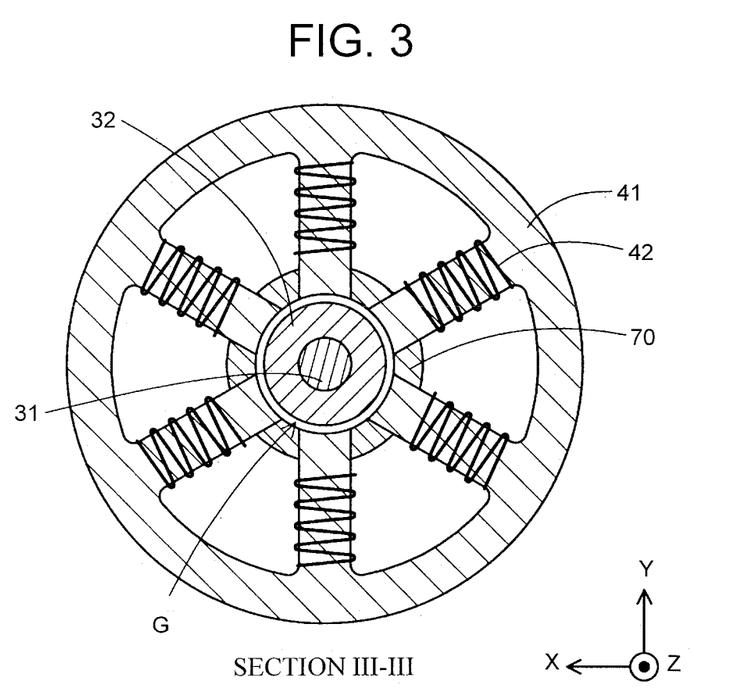
FIG. 3 is a view of section of the motor section shown in FIG. 1.
Figure 4:
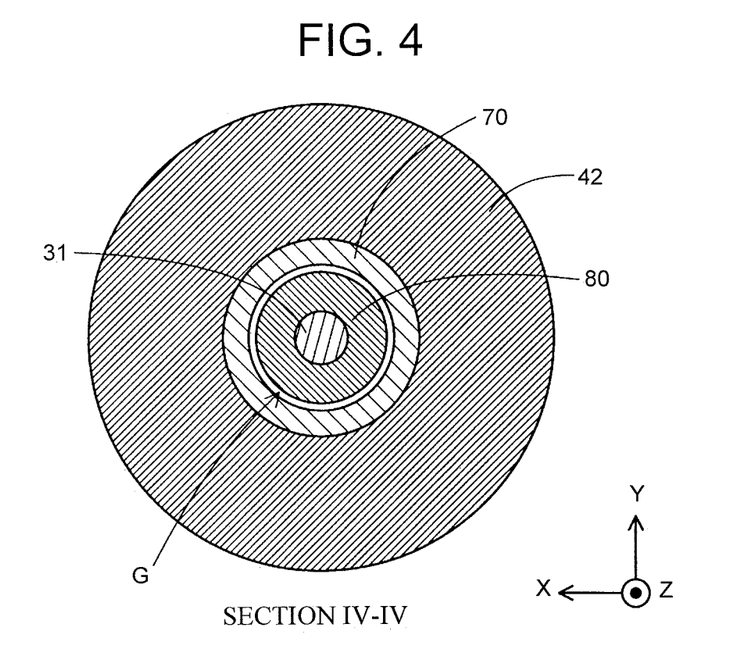
FIG. 4 is a view of section IV-IV of the motor section shown in FIG. 1.

FIG. 2 is a view of section II-II of the motor section 100 shown in FIG. 1. FIG. 3 is a view of section of the motor section 100 shown in FIG. 1. FIG. 4 is a view of section IV-IV of the motor section 100 shown in FIG. 1. In FIG. 2 to FIG. 4, the motor housing 90 is not shown. In the following, the first members 60, 80 and the second member 70 of the motor section 100 will be described with reference to FIG. 1 to FIG. 4. The first members 60, 80 and the second member 70 create, on the outer periphery of the rotor 32, a flow of a fluid directed from the one side toward the other side. The first members 60, 80 and the second member 70 are also called a "fluid control mechanism."

The first member 60 is disposed on the outer periphery of the rotating shaft 31 and rotates along with the rotating shaft 31. In this embodiment, the first member 60 is a spacer that fixes the position of the rotor 32 in the axial direction, and is in contact with an end portion, on the one side, of the rotor 32. The first member 60 is also called a "first spacer." The outside diameter of the first member 60 increases gradually from the one side toward the other side in the axial direction of the rotating shaft 31. In this embodiment, the first member 60 has a circular truncated conical shape with a bottom surface on the other side in the axial direction. As shown in FIG. 1, the outside diameter of an end portion of the first member 60 on the other side is substantially equal to the outside diameter of the end portion, on the one side, of the rotor 32.

The first member 80 is disposed on the outer periphery of the rotating shaft 31 and rotates along with the rotating shaft 31. In this embodiment, the first member 80 is a spacer that fixes the position of the rotor 32 in the axial direction, and is in contact with an end portion, on the other side, of the rotor 32. The first member 80 is also called a "second spacer." As shown in FIG. 1, the outside diameter of the first member 80 increases gradually in the axial direction, away from the rotor 32, at a portion facing the second member 70. As shown in FIG. 1, the outside diameter of an end portion, on the one side, of the first member 80 is substantially equal to the outside diameter of the end portion, on the other side, of the rotor 32.

As shown in FIG. 1, the first members 60, 80 have portions at which the outside diameters increase gradually from the one side toward the other side, and the first member 60, the rotor 32, and the first member 80 are formed such that the shapes of outer circumferential surfaces thereof are continuous. That the shapes of the outer circumferential surfaces are continuous means, for example, that there is no portion with an outside diameter smaller than the outside diameter of the rotor 32 between the first member 60 and the rotor 32. The first members 60, 80 are made of a non-magnetic material. Titanium or stainless steel can be used as the material of the first members 60, 80. That "the outside diameter of a member increases gradually from the one side toward the other side" may include a case where the outside diameter of that member increases from the one side toward the other side at one portion and remains constant at another portion.

The second member 70 is disposed on an inner periphery of the stator 40 so as to be separated by a gap G from the first members 60, 80 and the rotor 32, and encloses the first members 60, 80 and the rotor 32. In this embodiment, the second member 70 encloses a part stretching from an end portion, on the one side, of the first member 60 through the rotor 32 to a point at which the outside diameter of the first member 80 is largest. In this embodiment, the gap G has a dimension within a range of not smaller than 0.5% nor larger than 5% of the outside diameter of the end portion, on the one side, of the first member 60. The inside diameter of the second member 70 increases gradually from the one side toward the other side at portions facing the portions of the first members 60, 80 at which the outside diameters increase gradually. In this embodiment, as shown in FIG. 2 to FIG. 4, the second member 70 is fitted in the stator core 41. The second member 70 is made of a non-magnetic material. Titanium, stainless steel, resin, etc. can be used as the material of the second member 70. That "the inside diameter of a member increases gradually from the one side toward the other side" may include a case where the inside diameter of that member increases from the one side toward the other side at one portion and remains constant at another portion.

Figure 5:
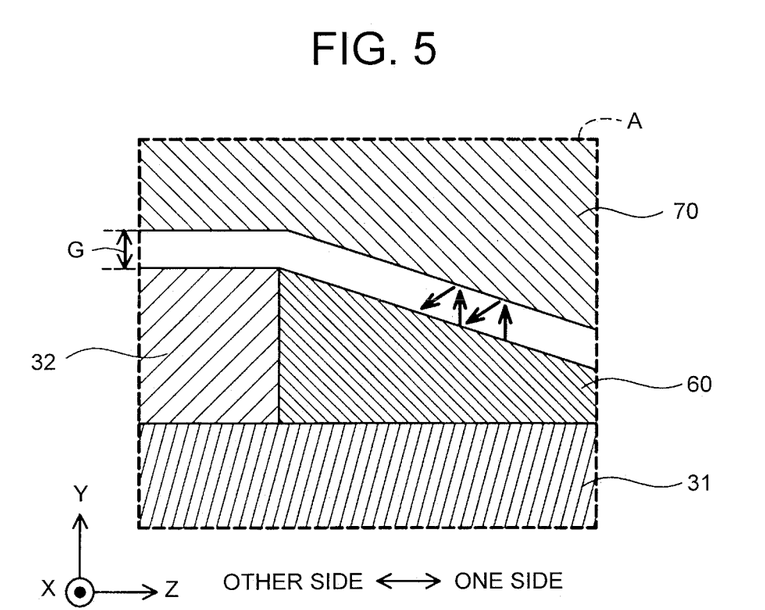
FIG. 5 is a view illustrating a flow of a fluid in a gap between a first member and a second member.
Figure 6:
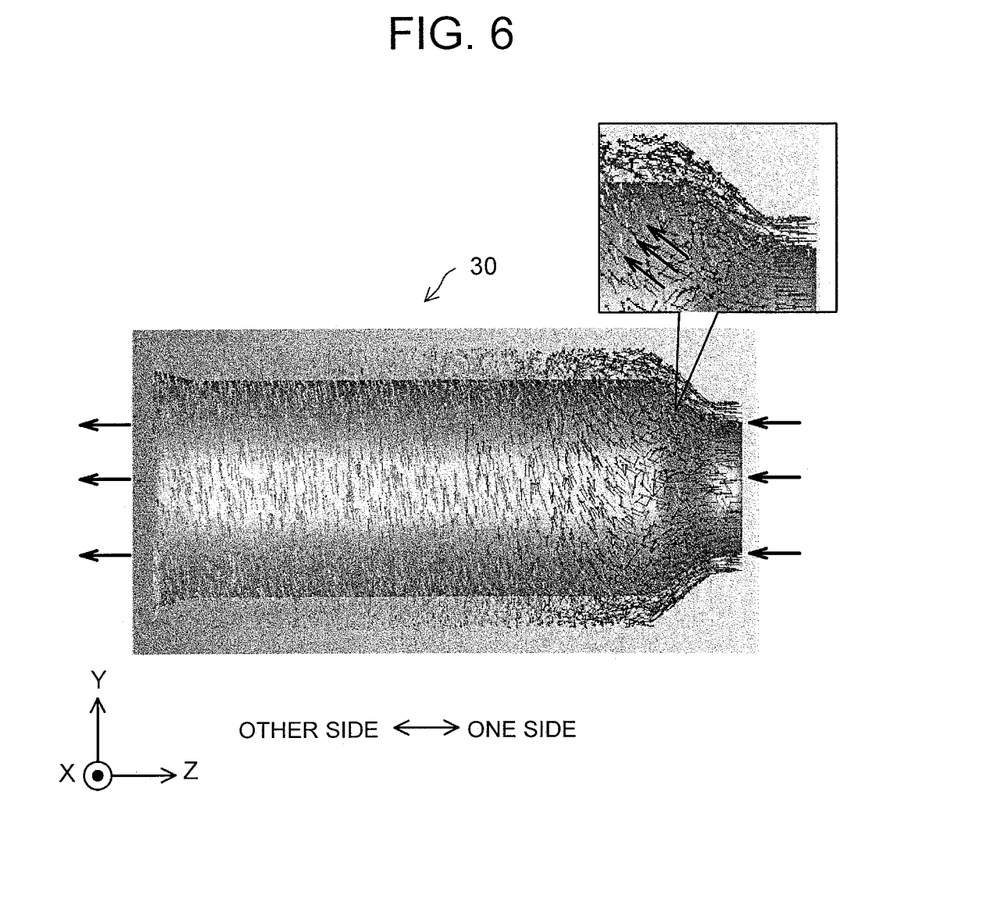
FIG. 6 is a view showing a result of a CAE analysis of a flow of a fluid occurring around a rotating body in a case where one first member, the rotor, and the other first member are regarded as the one rotating body.

FIG. 5 is a view illustrating a flow of a fluid in the gap G between the first member 60 and the second member 70. FIG. 5 shows part A of FIG. 1 on an enlarged scale. FIG. 6 is a view showing a result of a CAE analysis of a flow of a fluid occurring around a rotating body 30 in a case where the first member 60, the rotor 32, and the first member 80 are regarded as the one rotating body 30. The result shown in FIG. 6 is a result of a CAE analysis in a case where the second member 70 is disposed on an outer periphery of the rotating body 30 so as to be separated by the gap G from the rotating body 30. The arrows on the rotating body 30 in FIG. 6 indicate flow directions of the fluid. The inset in FIG. 6 shows a part of the analysis result on an enlarged scale. In the following, the flow of the fluid around the rotating body 30 will be described by using FIG. 5 and FIG. 6.

As shown in FIG. 5, the centrifugal force of the rotating first member 60 and rotor 32 causes the fluid around the first member 60 and the rotor 32 to flow toward the second member 70. The outside diameter of the first member 60 increases gradually from the one side toward the other side in the axial direction, and the inside diameter of the second member 70 increases gradually from the one side toward the other side at the portion facing the first member 60. As shown in FIG. 5, therefore, the fluid having flowed from the first member 60 toward the second member 70 and hit the second member 70 is given a velocity component directed from the one side toward the other side in the axial direction. The fluid having the velocity component directed from the one side toward the other side in the axial direction flows through the gap G between the first member 60 or the rotor 32 and the second member 70, from the one side toward the other side, while repeatedly hitting the first member 60 or the rotor 32 and the second member 70. Thus, as shown in FIG. 6, a flow of the fluid directed from the one side toward the other side occurs on the outer periphery of the rotor 32. In this embodiment, the first member 60 and the second member 70 draw the fluid in a space inside the motor housing 90, on the one side from the first member 60 and the second member 70, into the gap G between the first member 60 and the second member 70 and deliver the fluid toward the rotor 32.

Similarly, the fluid having flowed from the first member 80 located on the other side of the rotor 32 toward the second member 70 and hit the second member 70 is also given a velocity component directed from the one side toward the other side in the axial direction. The fluid having the velocity component directed from the one side toward the other side in the axial direction flows through the gap G between the first member 80 and the second member 70, from the one side toward the other side, while repeatedly hitting the first member 80 and the second member 70. Thus, a flow of the fluid directed from the one side toward the other side occurs also on an outer periphery of the first member 80. In this embodiment, the first member 80 and the second member 70 draw the fluid flowing on the outer periphery of the rotor 32 toward the first member 80 and discharge the fluid through the gap G between the first member 80 and the second member 70 to a space inside the motor housing 90, on the other side from the first member 80 and the second member 70.

In this form of implementation, a flow of a fluid directed from the one side toward the other side can be created on the outer periphery of the rotor 32. Thus, the cooling efficiency of the rotor 32 can be enhanced.

In this form of implementation, a flow of a fluid directed from the one side toward the other side can be created on the outer periphery of the rotor 32 by means of the second member 70 and the first member 60 that functions as the first spacer in contact with the end portion, on the one side, of the rotor 32. Thus, the configuration can be simplified compared with when a fan etc. is used to create such a flow of a fluid.

In this form of implementation, a flow of a fluid directed from the one side toward the other side can be created on the outer periphery of the rotor 32 by means of the second member 70 and the first member 80 that functions as the second spacer in contact with the end portion, on the other side, of the rotor 32. Thus, a larger velocity component directed from the one side toward the other side can be given to the fluid, compared with when the first member 80 is not used. Accordingly, the cooling efficiency of the rotor 32 can be further enhanced. Moreover, the configuration can be simplified compared with when a fan etc. is used to create such a flow of a fluid.

B. Second Embodiment

Figure 7:
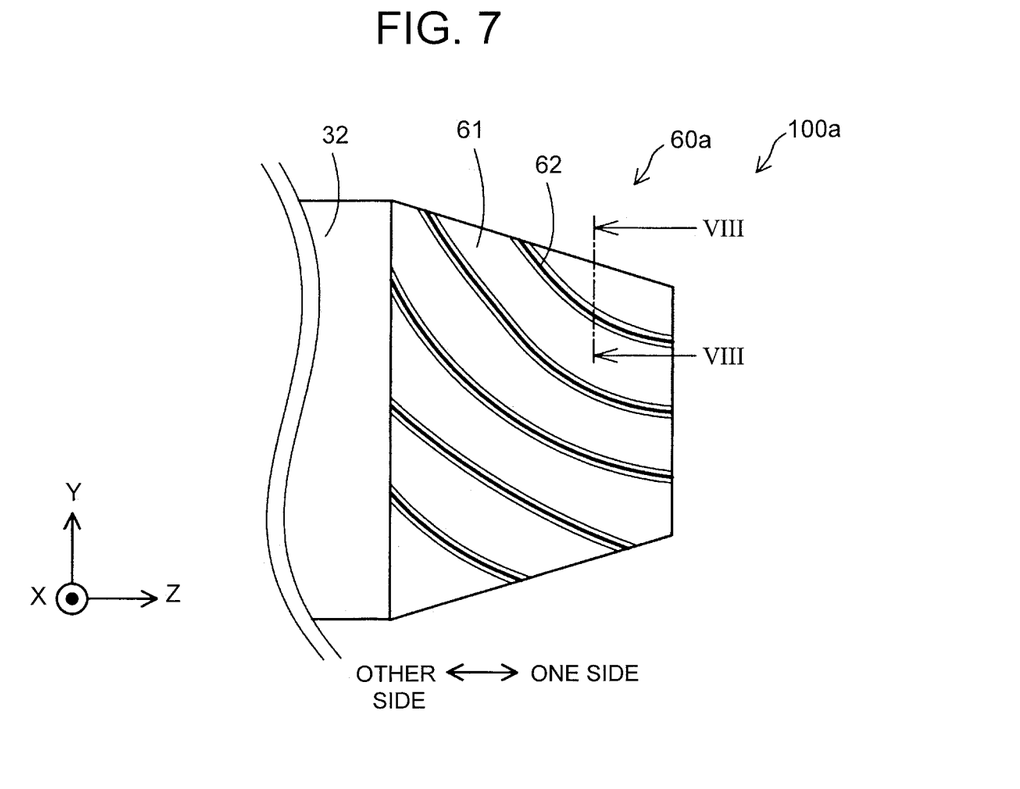
FIG. 7 is a schematic view of a first member of a motor section in a second embodiment.
Figure 8:
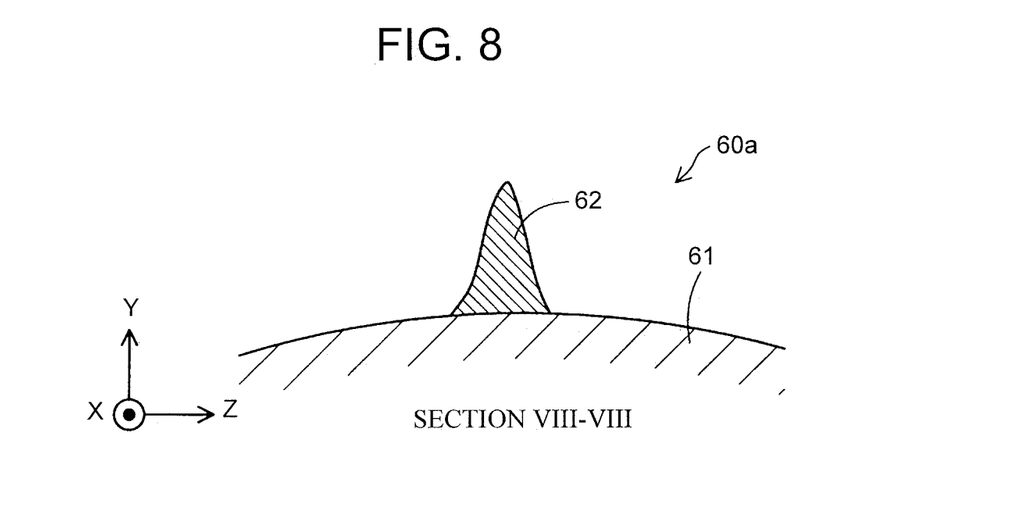
FIG. 8 is a view of section VIII-VIII of the first member shown in FIG. 7.

FIG. 7 is a schematic view of a first member 60a of a motor section 100a in a second embodiment. FIG. 8 is a view of section VIII-VIII in FIG. 7. In the following description, those components that are the same as in the first embodiment will be denoted by the same reference signs while the description thereof will be omitted. The motor section 100a in this embodiment is different from the motor section 100 in the first embodiment in that protrusions 62 are formed on an outer circumferential surface 61 of the first member 60a. The protrusions 62 are formed on the outer circumferential surface 61 of the first member 60a along the flow direction of the fluid according to the result of the CAE analysis shown in FIG. 6. The first member 60a has a substantially circular truncated conical shape with a bottom surface on the other side. The protrusions 62 are also called a "flow regulation structure" that regulates the flow of a fluid in the gap G.

In this form of implementation, the flow of the fluid in the gap G can be regulated. Thus, the cooling efficiency of the rotor 32 can be further enhanced.

Where to provide the flow regulation structure having been described in the second embodiment is not limited to the first member 60a but may also be the outer circumferential surface of the rotor 32 or the outer circumferential surface of the first member 80. If the flow regulation structure is provided in one of the first member 60a, the rotor 32, and the first member 80, the kinetic energy of these parts can be directly transferred to the fluid. Alternatively, the flow regulation structure may be provided on an inner circumferential surface of the second member 70. Instead of the protrusions 62, recesses formed along the flow of the fluid may be used as the flow regulation structure.

In the above embodiment, in the case where the protrusions 62 as the flow regulation structure are provided on the outer circumferential surface of the rotor 32, the protrusions 62 function also as fins that dissipate the heat of the rotor 32. Thus, the cooling efficiency of the rotor 32 can be enhanced even more.

C. Third Embodiment

Figure 9:
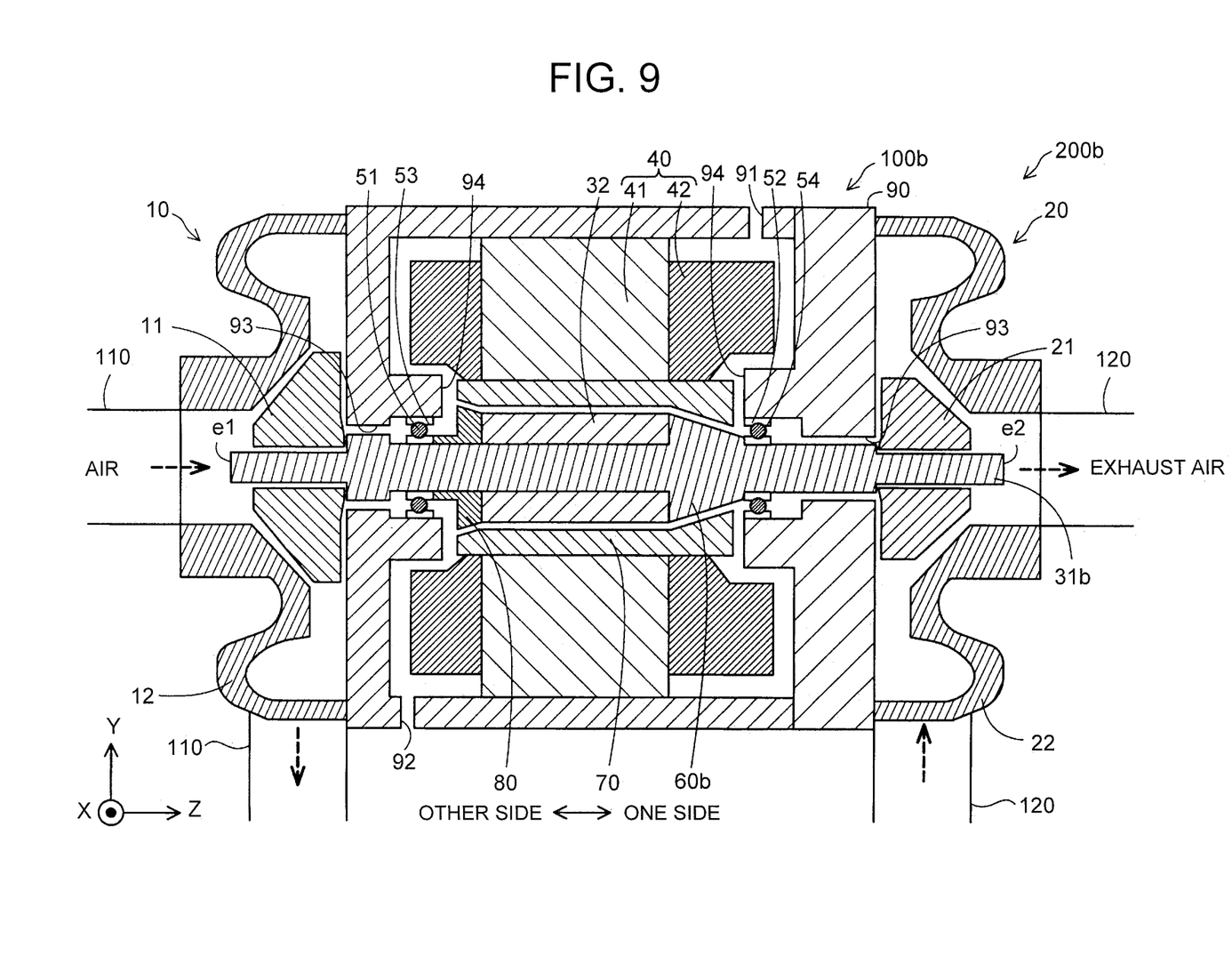
FIG. 9 is a schematic sectional view of a compression device in a third embodiment.

FIG. 9 is a schematic sectional view of a compression device 200b in a third embodiment. A motor section 100b of the compression device 200b in this embodiment is different from the motor section 100 in the first embodiment in that a rotating shaft 31b has a flange 60b protruding in a radial direction. The outside diameter of the flange 60b increases gradually from the one side toward the other side in the axial direction. An end portion, on the other side, of the flange 60b is in contact with the end portion, on the one side, of the rotor 32. In this embodiment, the flange 60b is also called a "first member." The flange 60b and the second member 70 create, on the outer periphery of the rotor 32, a flow of a fluid directed from the one side toward the other side.

In this form of implementation, a flow of a fluid directed from the one side toward the other side can be created on the outer periphery of the rotor 32 by means of the flange 60b of the rotating shaft 31 and the second member 70. Thus, the cooling efficiency of the rotor 32 can be enhanced.

D. Fourth Embodiment

Figure 10:
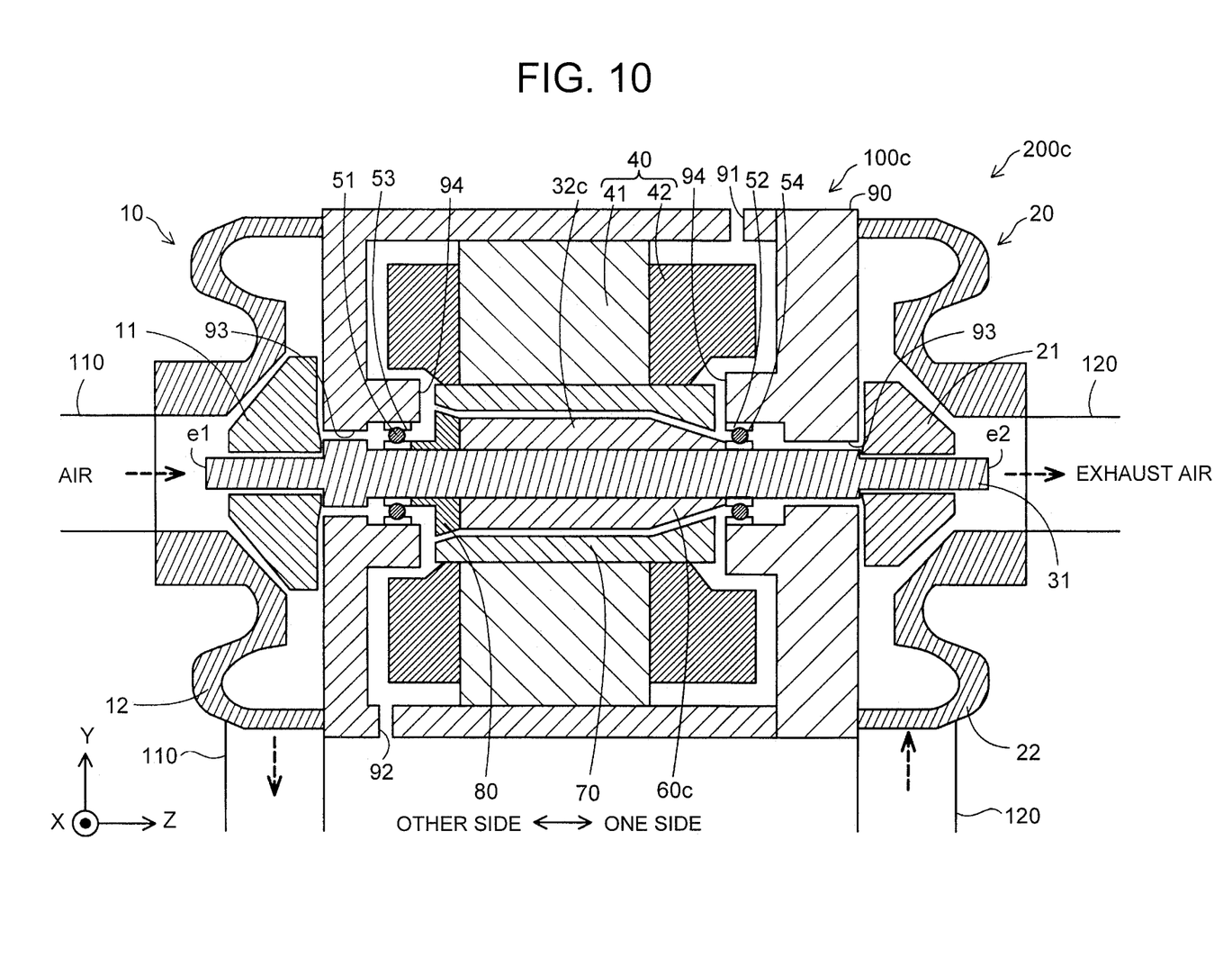
FIG. 10 is a schematic sectional view of a compression device in a fourth embodiment.

FIG. 10 is a schematic sectional view of a compression device 200c in a fourth embodiment. A motor section 100c of the compression device 200c in this embodiment is different from the motor section 100 in the first embodiment in that a rotor 32c has a portion 60c at which the outside diameter increases gradually from the one side toward the other side. In this embodiment, the portion 60c that is a part of the rotor 32c is also called a "first member." The portion 60c and the second member 70 create, on the outer periphery of the rotor 32c, a flow of a fluid directed from the one side toward the other side.

In this form of implementation, a flow of a fluid directed from the one side toward the other side can be created on the outer periphery of the rotor 32c by means of the portion 60c of the rotor 32c and the second member 70. Thus, the cooling efficiency of the rotor 32c can be enhanced.

E. Other Embodiments

E1. Another Embodiment 1

In the above embodiments, the first members 60, 60a, 80 have the portion at which the outside diameter increases gradually from the one side toward the other side. However, when either the first members 60, 60a or the first member 80 has a portion at which the outside diameter increases gradually from the one side toward the other side in the axial direction, a flow of a fluid directed from the one side toward the other side can be created on the outer periphery of the rotor 32.

E2. Another Embodiment 2

Figure 11:
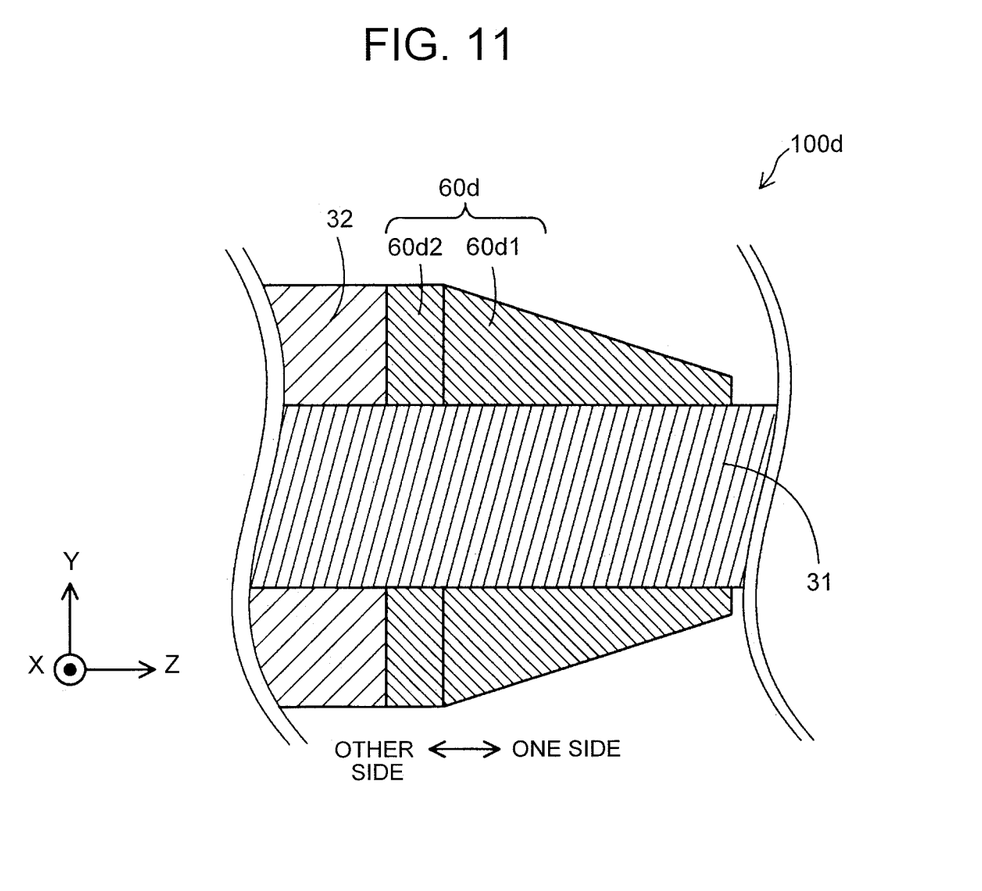
FIG. 11 is an enlarged sectional view around a first member.

FIG. 11 is an enlarged sectional view around a first member 60d of a motor section 100d in Another Embodiment 2. The first member 60d shown in FIG. 11 is composed of a plurality of spacers 60d1, 60d2. The outside diameter of the spacer 60d1 increases gradually from the one side toward the other side, while the outside diameter of the spacer 60d2 is constant. The shape of an outer circumferential surface of an end portion of the spacer 60d2 that is in contact with the rotor 32 is continuous with the shape of the outer circumferential surface of the rotor 32. As in the above embodiments, the cooling efficiency of the rotor 32 can be enhanced also in this form of implementation. Alternatively, the first member 80 and the second member 70 may also have a divided structure as with the first member 60d.

E3. Another Embodiment 3

Figure 12:
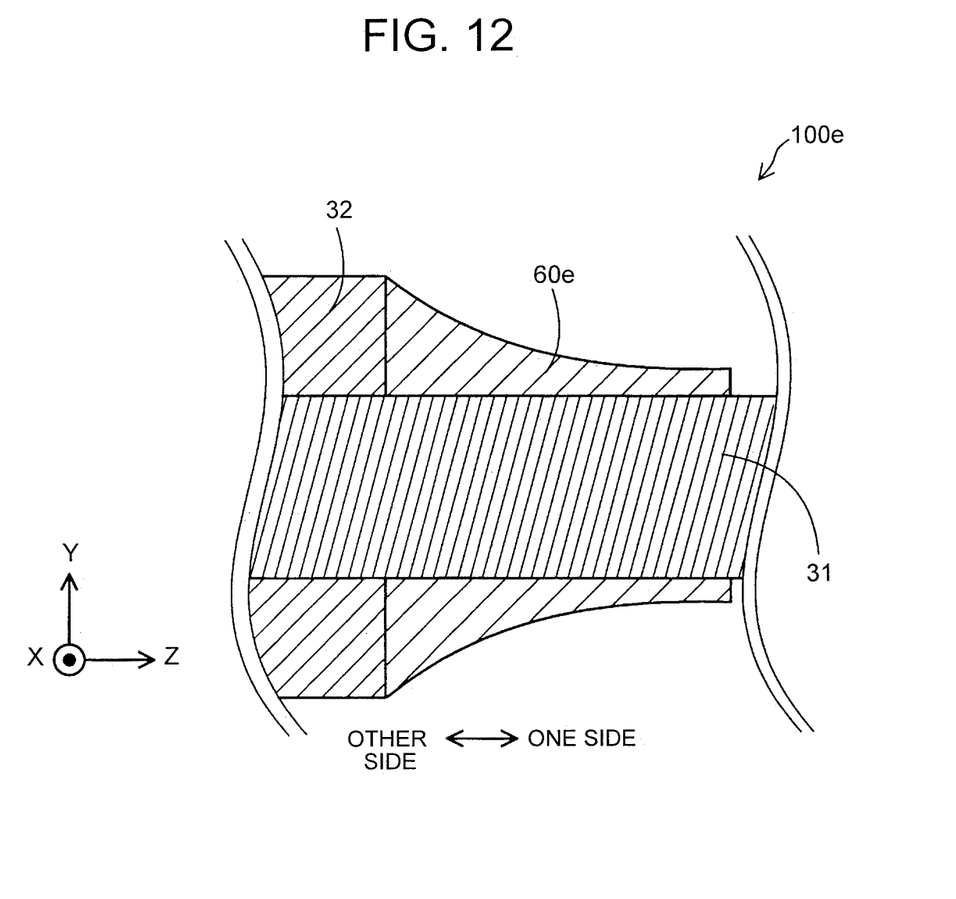
FIG. 12 is an enlarged sectional view around a first member.

FIG. 12 is an enlarged sectional view around a first member 60e of a motor section 100e in Another Embodiment 3. An outer circumferential surface of the first member 60e shown in FIG. 12 curves such that the outside diameter increases gradually from an end portion on the one side toward an end portion on the other side that is in contact with the rotor 32. The cooling efficiency of the rotor 32 can be enhanced as in the above embodiments also when the first member 60e of this shape is used. The inner circumferential surface of a portion of the second member 70 facing the first member 60e may also curve such that the inside diameter increases gradually from the one side toward the other side.

E4. Another Embodiment 4

In the above embodiments, the second member 70 is a member fitted inside the stator core 41. Alternatively, a resin mold for fixing the coils 42 to the stator core 41 may be formed in a shape conforming to the shapes of the outer circumferential surfaces of the first members 60, 60a, 60d, 60e, 80 and the rotors 32, 32c, and a part of the resin mold may be used as the second member 70.

E5. Another Embodiment 5

The fluid flowing through the gap G in the above embodiments is not limited to oil supplied into the motor housing 90 through the oil supply flow passage 91 but may also be a gas. The compression devices 200, 200b, 200c may be oil-free compression devices having air bearings.

E6. Another Embodiment 6

In the above embodiments, the gap G has a dimension within the range of not smaller than 0.5% nor larger than 5% of the outside diameter of the end portion, on the one side, of the first member 60. The value of the dimension of the gap G may instead be obtained by experiment or simulation using the outside diameter of the end portion, on the one side, of the first member 60, the viscosity of a fluid flowing through the gap G, and the rotation speed of the rotors 32, 32c, so as to give the fluid a large velocity component directed from the one side toward the other side while creating a flow of the fluid directed from the one side toward the other side on the outer periphery of the rotors 32, 32c. Alternatively, the gap G may be non-constant in dimension from the one side toward the other side.

E7. Another Embodiment 7

The fluid control mechanism described in the above embodiments may be provided in a generator to cool the outer periphery of the rotors 32, 32c rotated by an external device.

The present disclosure is not limited to the above embodiments but can be realized in various configurations within the scope of the gist of the disclosure. For example, to partially or entirely solve the above-described problem, or to achieve some or all of the above-described effects, the technical features described in the embodiments and the other embodiments corresponding to the technical features described in the form of implementation described in SUMMARY can be substituted or combined with one another as appropriate. Unless described as being essential in the present specification, technical features can be omitted as appropriate.

What is claimed is:

1. A rotating electrical machine comprising:
   a rotor disposed on an outer periphery of a rotating shaft and configured to rotate along with the rotating shaft;
   a stator configured to enclose the rotor; and
   a fluid control mechanism configured to create, on an outer periphery of the rotor, a flow of a fluid directed from one side toward the other side in an axial direction of the rotating shaft,
   wherein the fluid control mechanism includes:
      a first member that is disposed on the outer periphery of the rotating shaft, is configured to rotate along with the rotating shaft, has a portion at which an outside diameter of the first member increases gradually from the one side toward the other side, and is configured such that a shape of an outer circumferential surface of the first member is continuous with a shape of an outer circumferential surface of an end portion, in the axial direction, of the rotor; and
      a second member that is disposed on an inner periphery of the stator so as to be separated by a gap from the first member and the rotor, and is configured such that an inside diameter of the second member increases gradually from the one side toward the other side at a portion facing the portion of the first member at which the outside diameter increases gradually.

2. The rotating electrical machine according to claim 1, wherein a flow regulation structure that regulates a flow of a fluid in the gap is formed at least either on an inner circumferential surface of the second member or on at least one of an outer circumferential surface of the rotor and the outer circumferential surface of the first member.

3. The rotating electrical machine according to claim 1, wherein the first member includes a first spacer that is in contact with an end portion, on the one side, of the rotor.

4. The rotating electrical machine according to claim 1, wherein the first member includes a second spacer that is in contact with an end portion, on the other side, of the rotor.

5. The rotating electrical machine according to claim 1, wherein the first member includes a flange protruding in a radial direction of the rotating shaft.

6. The rotating electrical machine according to claim 1, wherein the first member is a part of the rotor.

7. The rotating electrical machine according to claim 1, wherein the gap has a dimension of not smaller than 0.5% nor larger than 5% of an outside diameter of an end portion, on the one side, of the first member.

8. The rotating electrical machine according to claim 2, wherein the flow regulation structure is a protrusion formed along the flow of the fluid.

9. The rotating electrical machine according to claim 2, wherein the flow regulation structure is a recess formed along the flow of the fluid.

\* \* \* \* \*